United States Patent [19]

McAlevey et al.

[11] Patent Number: 4,691,345
[45] Date of Patent: Sep. 1, 1987

[54] MULTIFUNCTION TWO LINE TELEPHONE SYSTEM

[75] Inventors: Richard J. McAlevey, Miami; Malcolm D. Muir, Coral Springs; Johan S. van der Laan, Miami, all of Fla.

[73] Assignee: Rice Multiphones, Inc., North Miami, Fla.

[21] Appl. No.: 861,928

[22] Filed: May 12, 1986

[51] Int. Cl.[4] .............................................. H04M 9/02
[52] U.S. Cl. .................................. 379/158; 379/160; 379/163; 379/166
[58] Field of Search ............... 379/157, 158, 159, 160, 379/162, 163, 164, 165, 166, 156

[56] References Cited

U.S. PATENT DOCUMENTS

| 3,470,322 | 9/1969 | Rice et al. | 379/158 |
| 3,567,867 | 3/1971 | Rice et al. | 379/158 |
| 4,132,860 | 1/1979 | Rasmussen | 379/165 X |
| 4,382,163 | 5/1983 | White et al. | 379/162 |
| 4,394,544 | 7/1983 | DeLeon | 379/166 X |

Primary Examiner—James L. Dwyer
Attorney, Agent, or Firm—Charles E. Baxley

[57] ABSTRACT

A two line telephone available for the home or the small business employs five pushbuttons for line selection, conference, hold and intercom. The line circuits and the conferencing switches are opto-isolated so that a single transformer coupled power supply is used. The usual illumination is provided in all of the pushbuttons to indicate that their function is being implemented. The conference function is implemented using the transformer coupled SCR circuit of U.S. Pat. No. 3,470,867.

9 Claims, 4 Drawing Figures

MULTIFUNCTION TWO LINE TELEPHONE SYSTEM

SUMMARY OF THE INVENTION

The present invention relates to telephones and specifically to a multifunction two line telephone which offers a user the features of two lines, transfer of calls, conference calling and hold, all within a circuit design which is simple and reliable.

The invention uses concepts described in U.S. Pat. Nos. 3,470,322 and 3,567,867, assigned to the same assignee as the instant application. Those patents disclose a conference and transfer circuit wherein a SCR (Triac) switch is connected in series with the windings of a transformer for coupling the lines of a two line telephone together in a conference call. That circuitry enables its use in all types of telephone signalling and exchange systems because the SCR effects line switching on the passage of line current to or through zero. The present invention uses on opto-isolated SCR (Triac) transformer connection with other elements to produce a multifunction telephone well suited to today's small business or home.

More particularly, the patents disclose a conference connection and call transfer device for effecting call transfer or conference connection between two or more mutually remote telephone subscribers at a subscriber station having a plurality application to all types of telephone signalling exchange systems including step-by-step, cross-bar and solid state. The lines are inductively coupled by means of a transformer having a winding for each of the lines to be coupled. Coupling is effected through a series-connected, bi-directional triode switch in each line circuit, whereby automatic disconnect is effected upon hanging up of the remote telephone subscriber set. Manual switch means are provided for switching a controlling telephone hand-set from the seized line to another line, at which time the transformer winding associated with the seized line serves as a terminal impedance for the line matching that of a hand-set to keep the line seized.

The two line telephone of the present invention operates with five pushbutton switches; one pushbutton each for LINE 1 and LINE 2, a CONFERENCE pushbutton and pushbuttons for HOLD and INTERCOM. The controls from these pushbuttons are gated to drive five relays, a LINE select relay, a CONFERENCE relay, an INTERCOM relay, and two CLEAR relays one for each of LINE 1 and LINE 2. Two line circuits are employed which are isolated from each other via opto-isolation devices. In addition, the hold/conferencing triode switches are also opto-isolated. The use of such isolation elements simplifies the circuit in that only a single power supply transformer is required for both lines. This is accomplished since the ground systems for each line are isolated from each other.

The principal object of this invention is the provision of a two line telephone for the home and small office which provides conferencing, intercom and hold features. Another object of the invention is the provision of a two line telephone which uses only a single-transformer as the line circuits are opto-isolated.

An additional object of the present invention is to provide a hold/conferencing function in a telephone using the TRIAC switch connections of U.S. Pat. Nos. 3,470,322 and 3,567,867.

BRIEF DESCRIPTION OF THE DRAWING

These as well as further objects and advantages of the invention will become apparent to those skilled in the art from a review of the following detailed specification and the accompanying drawings in which.

DETAILED DESCRIPTION

FIGS. 1–4 of the drawings show the entire schematic for the two line telephone of the present invention. Electrical leads which overlap from one Fig. to another are denoted with a capital letter. Matching the Figs. of the drawings with the leads matched by their capital letters will correctly connect the Figs. to form the composite schematic.

Figure 1:
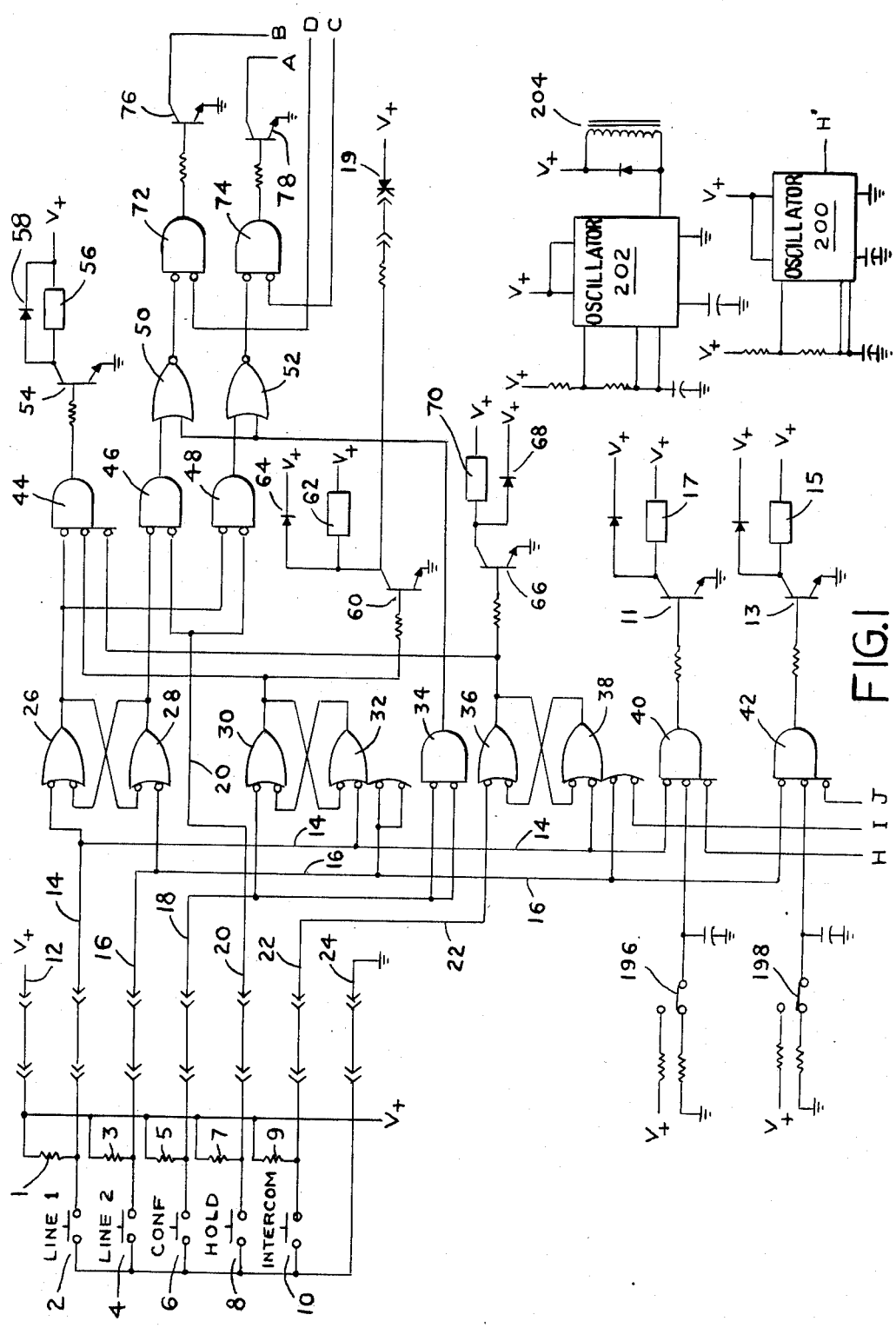
FIG. 1 is a schematic diagram of a portion of the two line telephone circuit showing the pushbuttons, the relays and the gates.

In FIG. 1, numerals 2, 4, 6, 8 and 10 denote control pushbutton switches on a telephone. Numeral 2 denotes a LINE 1 control button; numeral 4 is a LINE 2 control button; numeral 6 is a CONFERENCE control button; numeral 8 is a HOLD button; and numeral 10 is an INTERCOM control switch. Each of the pushbutton switches has one of its terminals grounded via a ground connection 24. The ungrounded terminals of each of the pushbuttons are connected to a source of voltage, V+, via a line 12, through suitable bias resistors, 1, 3, 5, 7 and 9. These ungrounded terminals are connected to the remainder of the telephone circuit via lines 14, 16, 18, 20 and 22.

More specifically, the line 14 connects the pushbutton 2 to one input of a gate 26. The line 16 connects the pushbutton 4 to one input of a gate 28. Together, the gates 26 and 28 comprise the line selection flip-flop. The line 16 also connects the pushbutton 4 to gates 32, 38 and 42. The pushbutton 2 is similarly connected to the gates 32, 38 and 40 via the line 14. The pushbutton 6 is connected to the gates 30 and 34 via the line 18. The pushbutton 8 is connected to gates 46 and 48 via the line 20. The pushbutton 10 is connected to a gate 36 via line 22.

The gates 30 and 32 are connected together to form the CONFERENCE flip-flop. The gates 36 and 38, similarly form the INTERCOM flip-flop.

Gates 40 and 42 serve to clear the connections to LINES 1 or 2. The inputs to gate 40 are the LINE 1 pushbutton 2 via line 14, the output from a time delay RC circuit 196, and the output from opto-isolator 104. The inputs to gate 42 are the LINE 2 pushbutton 4 via line 16, the output from a second time delay RC circuit 198 and the output from opto-isolator 124. The inputs to the INTERCOM flip-flop (gates 36, 38) are the INTERCOM pushbutton 10 via line 22, the LINE 1 pushbutton 2 via line 14, the LINE 2 pushbutton 4 via line 16 and the output of a comparator 186. The input to gate 34 is solely the CONFERENCE pushbutton 6 via line 18. The input to gate 30 is the CONFERENCE pushbutton 6 via line 18. Gate 32 receives as inputs, the LINE 1 pushbutton 2 via line 14 and the LINE 2 pushbutton 4 via line 16.

The output of the gate 26 is connected to another gate 44. The gate 44 also receives as inputs, the output from the gates 30 and 36. The output of the gate 28 is connected to a gate 46 which gate is also connected to the HOLD pushbutton 8 via a line 20. Another gate, 48, gates the output of the gate 26 with the HOLD pushbutton 8 via THE LINE 20. The output of the gate 44 is connected to a line select relay driver circuit consisting of transistor 54, DPDT relay 56 and a diode 58. This portion of the circuit controls the selection of LINE 1 or LINE 2.

The output of the gate 46 is gated in a gate 50 with the output of the gate 34. The output of gate 48 is connected to one input of a gate 52 along with the output of a gate 34. The output of the gate 36 is connected to another relay driver circuit which includes a transistor 66, a relay 70 and a diode 68. This relay driver circuit controls the INTERCOM connections.

The output of the gates 40 and 42 control respective relay driver circuits consisting of the transistor 11, the relay 17, and associated circuitry for gate 40; and the transistor 13, the relay 15 and associated circuitry for the gate 42. The output of the CONFERENCE relay driver circuit (transistor 60, etc.), is connected to a light emitting diode 19 to illuminate same during a CONFERENCE connection.

The output of gate 50 is connected to one input of a gate 72. The output of a gate 52 is connected to one input of a gate 74. The other input of gate 72 is the output of an opto-isolator 108. The other input to gate 74 is the output of the opto-isolator 130. Gates 72 and 74 are connected to the opto-coupled triacs 142 and 140, respectively via respective transistor drivers 76 and 78.

Figure 2:
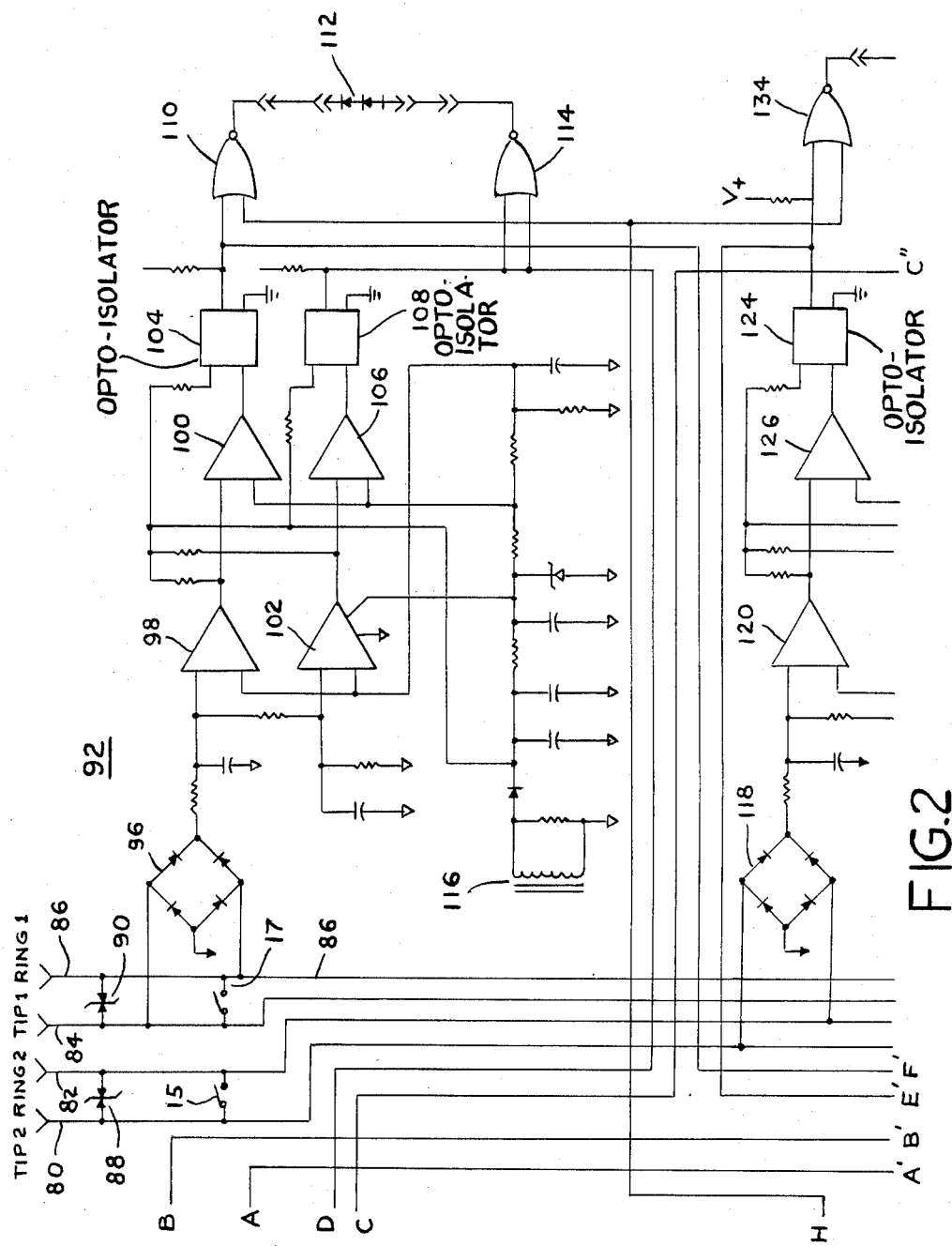
FIG. 2 is a schematic diagram of the line circuit for one of the two telephone lines.

The two telephone lines for the telephone of the present invention are shown in FIG. 2 at numerals 80 and 82, and 84, 86. Numerals 80, 82 denote, respectively, the tip and ring telephone lines for LINE 2, while numerals 84, 86 are, respectively, the tip and ring telephone lines for LINE 1. Two identical line circuits, shown generally at 92 for LINE 1 and at 94 for LINE 2, are provided. As these line circuits are identical, only the LINE 1 circuit 92 will be described in detail herein.

Specifically, the tip and ring lines, 84 and 86, are protected by varistor element 90 coupled between the lines. A relay 17, driven by the CLEAR LINE 1 relay driver transistor 11 discussed above and shown in FIG. 1, is connected across lines 84 and 86. A diode bridge circuit 96 is coupled across the lines 84, 86. The output of the bridge circuit 96 is connected as an input to a comparator 98 and as an input to another comparator, 102. Comparator 98 will be referred to as a "low comparator" while comparator 102 will be referred to as a "high comparator".

The output of the low comparator 98 is connected to another comparator 100. The output of the comparator 100 is connected to the opto-isolator 104 at the cathode thereof. The output of the high comparator 102 is connected to another comparator 106. The output of the comparator 106 is connected to the cathode of the opto-isolator 108. The output of the opto-isolator 104 is connected to a gate 110 and to the gate 40 as previously described. The output of the opto-isolator 108 is connected to a gate 114 and to the gate 72 as previously described. The gates 110 and 114 are connected to LED 112 which constitutes the illuminated light in the LINE 1 pushbutton 2.

Figure 4:
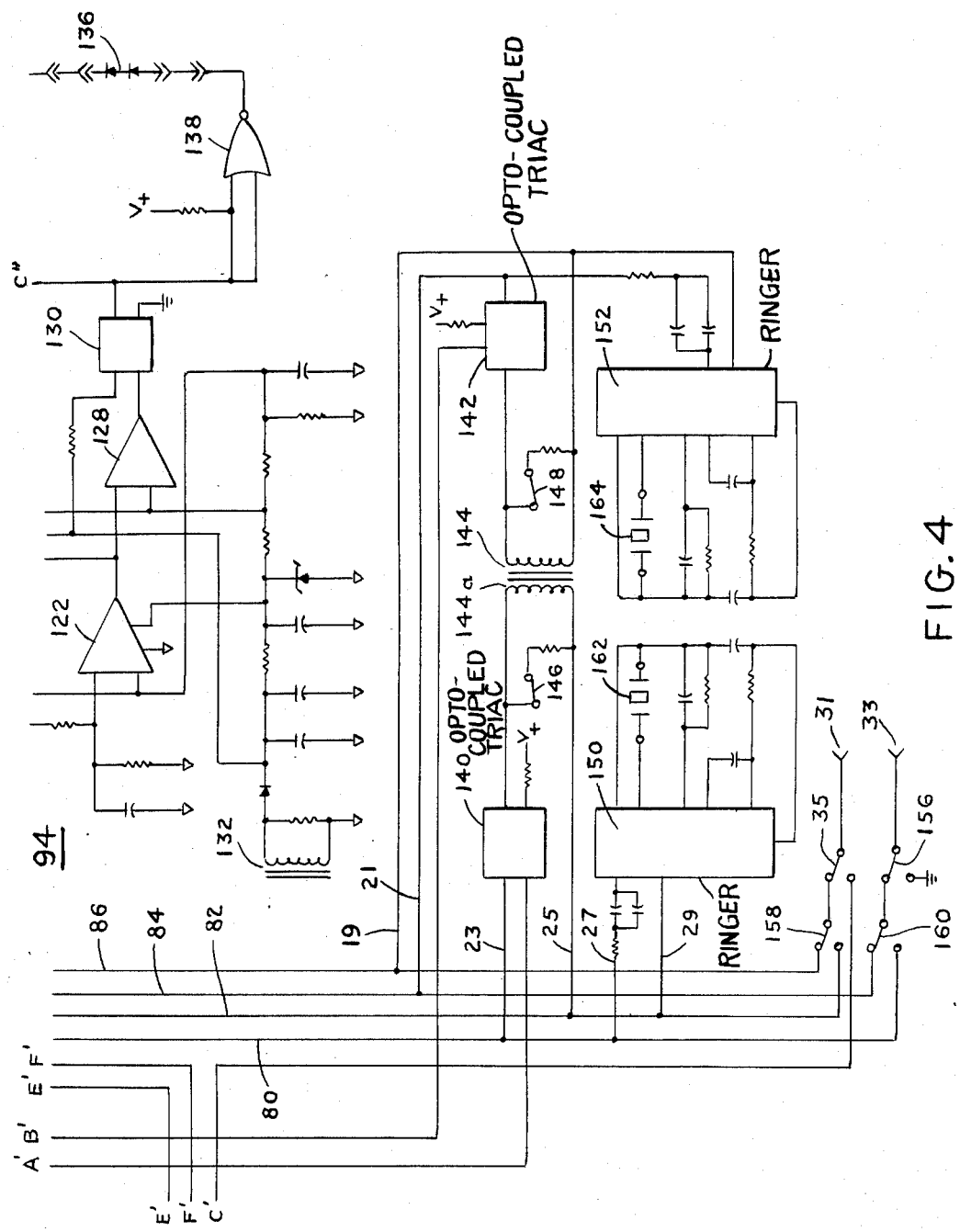
FIG. 4 is a schematic diagram of another portion of the circuit for the two line telephone showing the ringers, the conference connections and a portion of the line circuit.

Power is provided from an oscillator 202, FIG. 1, connected to the primary winding 204 of a transformer. The secondary windings of the transformer are shown at numeral 116 in the LINE 1 circuit 92 (FIG. 2) and at numeral 132 in the LINE 2 circuit 94 (FIG. 4). Another oscillator 200 is directly connected to the gate 110 in the LINE 1 circuit 92 and to the gate 134 in the LINE 2 circuit 94 to provide the flashing rate for the LED's when in HOLD.

As can be seen, the LINE 2 circuit 94 is the same as the LINE 1 circuit 92 with diode bridge 118 connected to lines 30 and 32, the tip and ring telephone lines. Numeral 136 is the illuminated LED in the LINE 2 pushbutton 4.

As previously discussed, the CONFERENCE and TRANSFER functions are implemented using the transformer coupling technique disclosed in U.S. Pat. Nos. 3,470,322 and 3,567,867 further improved by utilizing an opto-isolated drive and a relay contact to short the transformer winding for hold. The patented circuit in the present telephone is shown in FIG. 4 coupled to the windings of transformer 144. Specifically, an opto-coupled triac 142 is connected to one side of transformer 144. The LED cathode of the opto-coupled triac 142 is connected to the output of the gate 72. FIG. 1, via transistor 76 and to the tip line of LINE 1 telephone line via connection 21. The ring line 86 of LINE 1 is also connected to the transformer 144 via line 19. A relay 148 is connected across the winding of transformer 144 to provide the HOLD function. This relay contact is opened for conference operation.

Another opto-coupled triac 140 is connected to the other winding 144a of the transformer 144. This opto-coupled triac 140 is connected to the tip line 80 of the LINE 2 telephone line via line 23. The LED cathode of the opto-coupled triac 140 is connected to the output of the gate 74 via transistor 78. The ring line 82 of LINE 2 is connected to transformer 144 via line 26. A relay 146 is connected across winding 144a of the transformer 144 to provide the HOLD connection. This relay contact is opened for conference operation.

Lines 19 and 21 also connect the LINE 1 tip and ring lines 84 and 86 to a telephone "ring" circuit 152, 164. The LINE 2 "ring" is generated by 150, 162 and is connected to the LINE 2 tip and ring lines via lines 27 and 29. As these "ring" circuits are standard in the telephone arts, no further description will be made herein.

Numerals 31 and 33 denote the connection points for connection of the telephone of the present invention to the remainder of the telephone system. The line select relay 158 connects either ring line 86 or ring line 82 to terminal 31, while the INTERCOM relay 36 connects either the line select relay 158 or INTERCOM tip line 190 to terminal 31. Similarly, tip lines 84 or 80 can be connected to terminal 33 via line select relay 160 while INTERCOM relay 156 connects to either the line select relay 160 or directly to ground.

Figure 3:
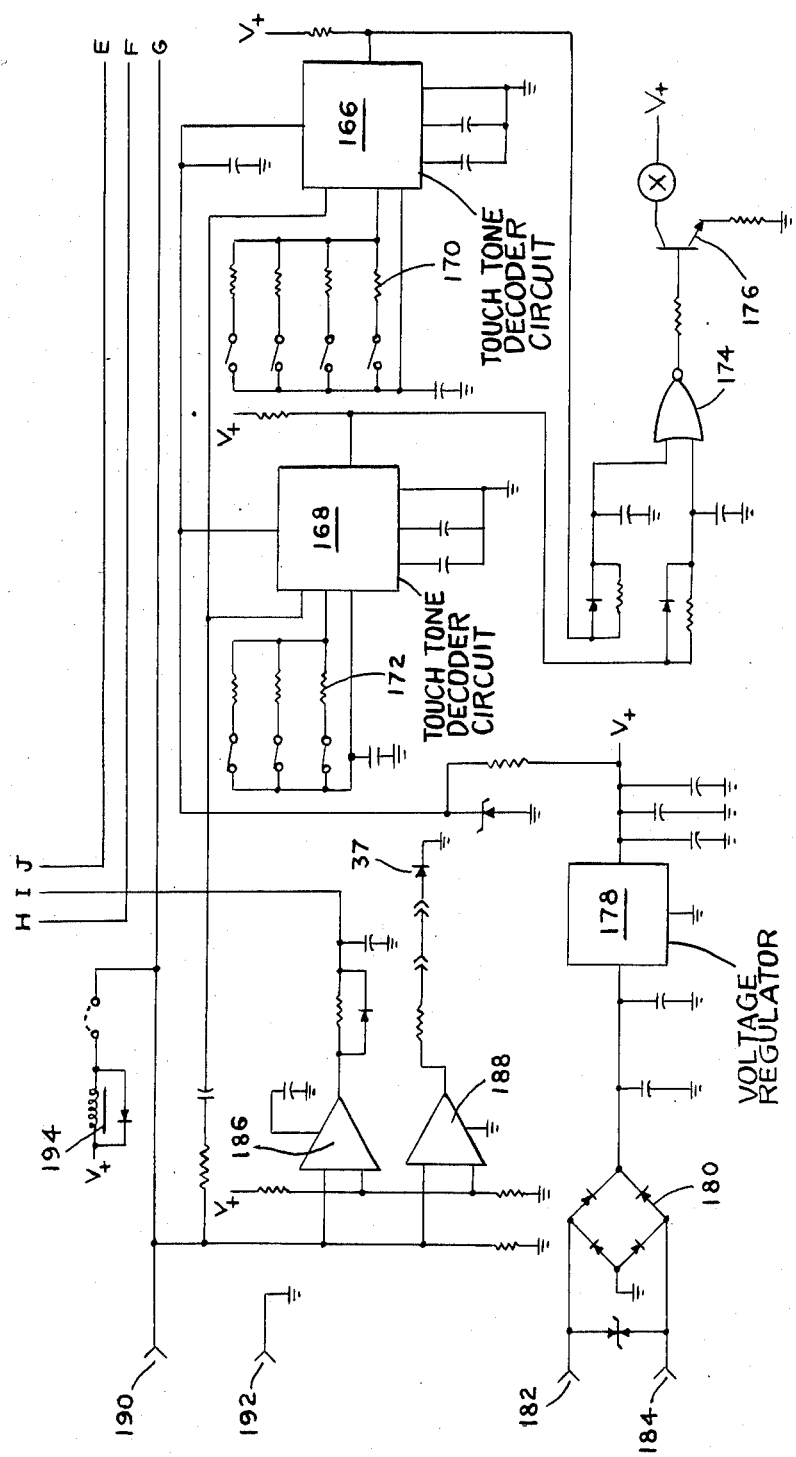
FIG. 3 is a schematic diagram of another portion of the two line telephone showing INTERCOM circuit.

Turning now to the remainder of the circuit shown in FIG. 3, AC power from a step down transformer is connected to the telephone via terminals 182 and 184 which is rectified in bridge 180 and connected to a voltage regulator 178. The power supply is, in turn, connected in usual fashion to the standard touch-tone decoder circuits shown generally at 166, 170 and 168, 172 for the INTERCOM function. As these are standard telephone circuits known to those skilled in the art, no further explanation will be made thereof herein.

The INTERCOM function is implemented by the circuit shown in FIG. 3 connected to the intercom tip and ring terminals 190, 192. Specifically, INTERCOM tip terminal 190 is connected to an INTERCOM relay 35, touch-tone decoder 166 and 168, and to the comparators 186 and 188. The output of comparator 188 is connected to the INTERCOM LED 37. The output of the comparator 186 is connected to the gate 38 in the INTERCOM flip-flop.

A talk battery for the INTERCOM circuit may be provided as is shown at numeral 194.

The circuit functions to present the user with the following capability. First, the user can push either the LINE 1 pushbutton 2 or the LINE 2 pushbutton 4, then lift the receiver to place a call in the normal manner. The pushbuttons 2 and 4 will indicate the status of each line; if the light is OFF, the line is available, if the light is solidly ON, the line is in use, and if the light is slowly blinking, the line is in HOLD.

To answer a call, the two ringers 150 and 152 are provided, one for each line with each ringer making different tones to distinguish the lines. The LED for the line being called will flicker indicating which line is being called.

To place a call on HOLD, the HOLD pushbutton 8 is depressed. To retrieve a call on HOLD, the LINE 1 or the LINE 2 buttons, 2 or 4 are used. When a call is on HOLD, the LED will flash slowly. If another station answers the call, the LED display will change to solid ON indicating that the LINE is in use.

To establish a CONFERENCE, a call is made or received on either LINE 1 or LINE 2. The CONFERENCE pushbutton 6 is then depressed. Specifically, a call can be placed on LINE 1, then placed in HOLD. LINE 2 is selected and another call is placed on LINE 2. The CONFERENCE is initiated by simply pushing the CONFERENCE pushbutton 6. The initiator can leave the CONFERENCE by hanging up. To return to normal operation, either LINE 1 or LINE 2 pushbuttons 2 or 4 is depressed which disables the CONFERENCE and places the other LINE in HOLD.

INTERCOM is used by simply depressing the INTERCOM pushbutton 10, then dialing the other station's number. INTERCOM is released by pushing either the LINE 1 or the LINE 2 pushbuttons 2 or 4 and the telephone connection is returned to an outside line.

In responding to INTERCOM, the INTERCOM pushbutton at the receiving telephone is depressed and the receiver is removed. Again, the return to an outside line is accomplished using the LINE 1 or 2 pushbuttons 2 or 4.

The telephone of the present invention is designed to continue to operate if AC power is lost. The phone will operate as a single line telephone on LINE 1. Both of the ringers 150 and 152 will continue to operate but the lights, LINE 2, HOLD, CONFERENCE and INTERCOM will not operate.

If an incoming line is disconnected, the LED for that line will blink as if the line is on HOLD. Depressing the blinking line pushbutton in this condition will cause the telephone to generate a buzzing sound.

As modifications may be made to the foregoing without departing from the scope and spirit hereof, what is desired to be covered by U.S. Letters Patent is described in the appended claims.

We claim:

1. A multi-function two line telephone comprising: means for receiving a first and a second telephone line each line including tip and ring lines; a line circuit for each of said telephone lines, each of said line circuits including first and second comparators connected to said telephone line for comparing the signals on said line with predetermined reference signals, and opto-isolator means connected to said comparators for isolating said line circuits; transformer means for inductively coupling said telephone lines; opto-isolated triac means connected between said telephone lines and said transformer means for connecting said lines in a conference connection; pushbutton switch means connected to said triac means for switching same to implement said conference connection; second pushbutton switch means connected to said triac means for implementing a hold function; further pushbutton switch means connected to said telephone lines; relay means connected between said further pushbutton switch means and said telephone lines; said further pushbutton means actuating said relay means to implement an intercom function.

2. A multi-function two line telephone comprising: a first set of terminals for receiving the tip and ring lines of two telephone lines; a second set of terminals for coupling the telephone to another telephone so that the output of the telephones are interconnected to each other; a plurality of manually operated switches for selecting between said two telephone lines, connecting said lines together in a conference connection, placing calls on either of said telephone lines in hold, and implementing a connection between telephones; a first relay connected to said line selection switch means for automatically connecting one or the other of said telephone lines to the telephone; a second relay connected to said conference switch means; a transformer connected across each of said telephone lines; said second relay connected across the windings of said transformer; a third relay connected to said second set of terminals for connecting said terminals to said telephone lines; fourth and fifth relays connected across said first set of terminals for clearing said telephone lines; and time delay circuit means connected to said fourth and fifth relays for actuating same after expiration of a predetermined time delay.

3. A two line telephone having intercom, conference, hold, and line select capabilities said telephone comprising: a first manually operable switch means for connecting the telephone to the first telephone line; a second manually operable switch means for connecting the telephone to the second telephone line; a third manually operable switch means for connecting said two telephone lines together in a conference connection; a fourth manually operable switch means for placing said telephone lines on hold; and a fifth manually operable switch means for connecting the telephone to another telephone in an intercom connection; an opto-isolated line circuit for each of said telephone lines, said line circuit including first and second comparators for comparing signals on said telephone lines with predetermined reference signals and generating an output indicative of the results of said comparison; an opto-isolated triac switch means for each of said telephone lines connected to said third manually operable switch means for connecting said lines in the conference connection, said opto-isolated elements enabling the use of a simplified power supply for said telephone.

4. The telephone of claim 3 wherein a power supply comprising an oscillator and a transformer is employed in said telephone, said transformer coupling the output of said oscillator to said line circuits.

5. The telephone of claim 3 wherein said conference connection includes a transformer having a winding connected across each of said telephone lines; said windings being connected in series with said opto-isolated triac means; and relay means connected across each of said windings; said relay means and said triac means connected to said third manually operable switch means.

6. The telephone of claim 3 further including clear relays connected across said telephone line terminals, said clear relays being connected to said line circuits and to said first and second manually operable switch means; first and second time delay circuits connected to said clear relays for permitting said relays to clear said terminals until expiration of a predetermined time delay.

7. The telephone of claim 6 further including a battery connected to said fifth manually operable switch means for providing power to said intercom circuit.

8. The telephone of claim 7 wherein each of said manually operable switch means includes means for illuminating said switches on actuation of the function associated therewith.

9. The telephone of claim 3 including a plurality of relays connected to said first set of terminals, a first relay for selecting between said two telephone lines, a second relay for implementing said conference function, a third relay connected to said fifth manually operable switch means, and third and fourth time delayed clear relays connected across said first set of terminals.

* * * * *